US010984072B1

(12) United States Patent
Mattingly

(10) Patent No.: US 10,984,072 B1
(45) Date of Patent: Apr. 20, 2021

(54) FAST FOURIER TRANSFORM (FFT) CIRCUIT WITH AN INTEGRATED HALF-BIN OFFSET

(71) Applicant: Rockwell Collins, Inc., Cedar Rapids, IA (US)

(72) Inventor: Sean W. Mattingly, Forest Grove, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 234 days.

(21) Appl. No.: 16/280,150

(22) Filed: Feb. 20, 2019

(51) Int. Cl.
*G06F 17/14* (2006.01)

(52) U.S. Cl.
CPC .................. *G06F 17/142* (2013.01)

(58) Field of Classification Search
CPC ............................. G06F 17/14–142
See application file for complete search history.

(56) References Cited

U.S. PATENT DOCUMENTS

| 5,034,910 | A | * | 7/1991 | Whelchel | G06F 17/142 |
| | | | | | 708/407 |
| 2018/0270091 | A1 | * | 9/2018 | Sharpe | H04L 27/2692 |
| 2019/0025420 | A1 | * | 1/2019 | Frick | G01S 13/588 |

OTHER PUBLICATIONS

Stack Exchange, "How to shift FFT spectrum by half a bin?", retrieved from https://dsp.stackexchange.com/questions/49358/how-to-shift-fft-spectrum-by-half-a-bin (Year: 2018).*
A. G. Dempster and M. D. Macleod. Constant integer multiplication using minimum adders. IEE Proceedings—Circuits, Devices and Systems, 141(5):407-413, Oct. 1994.
F. J. Harris. On the use of windows for harmonic analysis with the discrete fourier transform. Proceedings of the IEEE, 66(1):51-83, Jan. 1978.
Shousheng He and Mat Torkelson, "A New Approach to Pipeline FFT Processor," Proceedings of IPPS '96, IEEE, 1996.

* cited by examiner

*Primary Examiner* — Matthew D Sandifer
(74) *Attorney, Agent, or Firm* — Suiter Swantz pc llo

(57) ABSTRACT

A fast Fourier transform (FFT) circuit with an integrated half-bin offset for performing both an FFT and a half-bin offset on an input signal. The FFT circuit is configured to receive input samples of the input signal and generate output signals via a plurality of butterfly circuits and one or more twiddle stage multiplier circuits of the FFT circuit. One or more of the butterfly circuits are configured to implement a first portion of both the half-bin offset and the FFT by integrating a first set of computations for both the half-bin offset and the FFT within the one or more of the plurality of butterfly circuits. At least one of the one or more twiddle stage multiplier circuits is configured to implement a second portion of both the half-bin offset and the FFT by integrating a second set of computations of both the half-bin offset and the FFT within the twiddle stage multiplier circuit.

20 Claims, 13 Drawing Sheets

FAST FOURIER TRANSFORM (FFT) CIRCUIT WITH AN INTEGRATED HALF-BIN OFFSET

GOVERNMENT CONTRACT

The invention was made with Government support under Contract No. FA8807-12-C-0013 awarded by the Department of the Air Force. The Government has certain rights in this invention.

BACKGROUND

Embodiments of the inventive concepts disclosed herein relate generally to the field of radio systems. More particularly, embodiments of the inventive concepts disclosed herein relate to a circuit for implementing a Fast Fourier Transform (FFT) for signals of radio systems.

Frequency spectra of discrete sampled data of a signal (e.g., a radio frequency (RF) signal), as determined by an FFT, can be subject to spectral leakage when the number of frequency bins, set ranges of frequencies, in the FFT is low. Assuming no windowing is performed, the spectral leakage can result in a 3.9 dB loss if a signal is exactly in-between the frequency ranges of two separate frequency bins, when signals are off the orthogonal basis imposed by a kernel of the FFT. The result of a signal falling exactly between the frequency ranges of two bins is referred to as "scalloping loss." Scalloping loss can be caused by, for example, Doppler effects on a signal source. Scalloping loss also results in higher acquisition times for a signal to achieve a desired signal-to-noise ratio (SNR). There are some methods that can be used to avoid spectral leakage for an FFT. However, these methods assume that memory, processing power, and other computing resources are unlimited which is often not the case with many forms of technology. For example, systems including a global positioning system (GPS) may have chip size, power consumption, and processing power requirements.

One method for avoiding scalloping loss is using a windowing function to mitigate leakage. However, in the case of low signal power, windowing has the cost of lowering the estimated power spectral density (PSD) to variance ratio of signals although it realizes better bin positioning. PSD to variance ratios can be attenuated by overlapping and statistically averaging adjacent data sets.

Another method to avoid scalloping loss is to use a high resolution FFT (e.g., a longer FFT). A high resolution FFT could include many frequency bins each with a small frequency range. For example, a high resolution FFT results in a larger number of bins spread from 0 Hz to the Nyquist sampling frequency of the input signal. While this would reduce the sensitivity of the FFT transform to the scalloping effect, the high resolution FFT would require additional hardware for implementation, especially if required to be performed in real-time. This additional hardware would be a major drawback for a low power system that may have hardware requirements.

In a real-time data processing system analyzing very low power signals, such as GPS signals, unlimited data processing circuitry is not available. Trade-offs must be made taking into account available hardware (e.g., the number of multipliers, the amount of memory used, the time required to perform the required computations) and the format the data is coming in must be taken into account. Moreover, for very low signal power strength, the increased PSD variance due to a technique such as a windowing function is not acceptable.

SUMMARY

In one aspect, the inventive concepts disclosed herein are directed to a fast Fourier transform (FFT) circuit with an integrated half-bin offset for performing both an FFT and a half-bin offset on an input signal. The FFT circuit is configured to receive input samples of the input signal and generate output signals via butterfly circuits and one or more twiddle stage multiplier circuits of the FFT circuit, wherein the output signals are signals representing a frequency spectrum of the input signal. The one or more butterfly circuits of the butterfly circuits are configured to implement a first portion of both the half-bin offset and the FFT by integrating a first set of computations for both the half-bin offset and the FFT within the one or more of the butterfly circuits. At least one of the one or more twiddle stage multiplier circuits is configured to implement a second portion of both the half-bin offset and the FFT by integrating a second set of computations of both the half-bin offset and the FFT within the twiddle stage multiplier circuit.

In a further aspect, the inventive concepts disclosed herein are directed to a signal processing system. The signal processing system includes a receiver system configured to receive a signal and generate samples of the signal. The signal processing system includes a fast Fourier transform (FFT) circuit, the FFT circuit configured to receive the samples of the signal and generate output signals via butterfly circuits and one or more twiddle stage multiplier circuits, wherein the output signals are signals representing a frequency spectrum of the signal. One or more butterfly circuits of the butterfly circuits are configured to implement a first portion of both a half-bin offset and a FFT by integrating a first set of computations for both the half-bin offset and the FFT within the one or more of the butterfly circuits. At least one of the one or more twiddle stage multiplier circuits is configured to implement a second portion of both the half-bin offset and the FFT by integrating a second set of computations of both the half-bin offset and the FFT within the twiddle stage multiplier circuit.

In a further aspect, the inventive concepts disclosed herein are directed to a method of processing an input signal to perform both an FFT and a half-bin offset. The method includes receiving, via a fast Fourier transform (FFT) circuit, input samples of the input signal. The method includes generating, via the FFT circuit, output signals based on the input samples via butterfly circuits and one or more twiddle stage multiplier circuit of the FFT circuit, wherein the output signals are signals representing a frequency spectrum of the input signal by implementing, by one or more butterfly circuits of the butterfly circuits, a first portion of both the half-bin offset and the FFT by performing a first set of computations for both the half-bin offset and the FFT and implementing a second portion of both the half-bin offset and the FFT by performing a second set of computations of both the half-bin offset and the FFT within at least one of the one or more twiddle stage multiplier circuit.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
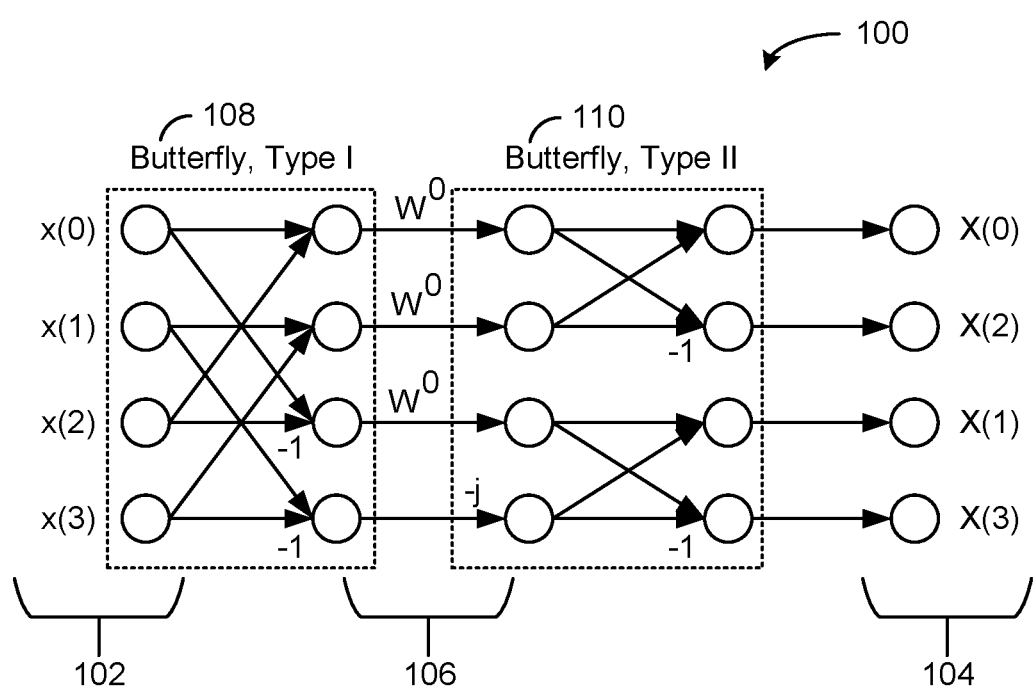
FIG. 1 is a circuit block diagram of a four element FFT according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the figures, systems and methods for an FFT with an integrated half-bin offset are described with respect to various aspects of the inventive concepts. In some applications of an FFT, a circuit is needed that utilizes reduced amounts of hardware requirements allowing the circuit to result in lower heat, low circuit board area consumption, and reduced numbers of components (e.g., less multiplier circuits) without lowering a PSD to variance ratio (e.g., as occurs when using a windowing function that prevents scalloping loss). Rather than windowing incoming data in time, a circuit is configured, in some embodiments, to include two FFTs that can be performed on input data. The first FFT may be a regular FFT while the second FFT may be a half-bin offset, an FFT with frequency bins offset by a half-bin relative to the frequency bins of the regular FFT. When superposed, the two FFT transforms can result in a spectrum with scalloping loss of only 0.9 dB.

The half-bin offset can be implemented in a circuit using the Fourier transform conjugate variable shift property, $$\mathcal{F}\{e^{-2\pi i \alpha t} f(t)\} = \hat{f}(v+\alpha) \qquad \text{(Equation 1)}$$

where $\mathcal{F}$ denotes the Fourier transform and v is the Fourier conjugate variable frequency. In a hardware-based signal processing application, this half-bin offset can be implemented in fixed point with four configurable Booth multipliers. The half-bin offset may be an entire stage in an overall FFT circuit requiring a complex multiplier with lookup tables for the exponential values of the half-bin offset, resulting in expensive operation on an application specific integrated circuit (ASIC) or a field programmable gate array (FPGA) (e.g., the overall FFT circuit). This extra logic takes up valuable space and time in an ASIC or FPGA and may require that an ASIC be created anew for every instantiation of an FFT on the ASIC.

As described herein, an FFT with a built-in half-bin offset can be implemented to reduce processing and circuit component consumption of a circuit. This integration can be realized by manipulating the properties of the complex exponential used to create a half-bin frequency shift; the half-bin offset can be applied inside the FFT itself rather than with a separate multiplier circuit. This allows the existing twiddle multiplier of the FFT to be reused for both the FFT and the half-bin offset, resulting in savings of a complex multiplier stage and resulting in a more streamlined FFT. More specifically, the FFT circuit with the integrated half-bin offset can remove the need for a multiplier stage before an FFT to perform the half-bin offset.

Described herein is the circuit derivation including the illustration of modified butterfly circuits used to perform the integration of the half-bin offset into the FFT. Furthermore, test results of the FFT with the integrated half-bin offset are included herein verifying the operation of the FFT. The hardware circuits described herein, which may utilize a radix $2^2$ single delay feedback FFT, is verified using MATLAB scripts and Simulink simulation of hardware descriptive language (HDL) coder compatible blocks, the results are included herein. The results are verified separately using both the MATLAB scripts for individual butterflies of the FFT with the integrated half-bin offset and the Simulink to HDL code model of a single-delay feedback FFT butterfly.

More particularly, the FFT with the built-in half-bin offset can be implemented with an FFT butterfly combined with a half-bin offset (HBO) exponential in order to absorb the HBO exponential into hardware implementations of the FFT butterfly, using an existing twiddle multiplier stage to also apply the HBO exponential. By utilizing this integration, an FFT circuit can remove four multipliers in some embodiments. Furthermore, to implement the integration, instead of full multipliers, two canonical signed digit (CSD) constant integer multipliers (a simpler operation than a full multiplier), two adders, two bit-shifters, and a unary minus can be utilized. Also, extra pipeling stages that were necessary for the multipliers are also available to perform the integration.

Although the FFT circuit with the integrated half-bin offset is described as a sixteen element FFT herein, any element FFT can include an integrated half-bin offset according to the techniques described herein. For example, an FFT with any number of bins can include an integrated half-bin offset.

Although the FFT with the integrated half-bin offset can be implemented in any type of receiver and/or signal processing system, in some embodiments, the FFT with the integrated half-bin offset can be implemented in a GPS receiver for signal tracking and acquisition. The FFT with the integrated half-bin offset may be of particular importance to low signal to noise ratio signal based systems.

The FFT may be particularly applicable to GPS since it utilizes low power consumption and low circuit board area while maintaining performance levels to meet signal acquisition and tracking requirements. In some cases, an FFT is used across all GPS receivers and is frequently instantiated numerous times on a single piece of hardware for multiple GPS signal/track channels. The circuit board heat, chip size, low power requirements, reduction in number of heat sinking elements, etc. can be relevant for various systems. The lower area requirements of the FFT may mean that more logic can be packed onto an ASIC if desired to improve signal acquisition, tracking, and anti jam features before handing off the frequency spectrum results generated by the FFT to other processing software or circuits. Furthermore, some GPS systems are powered with batteries and thus, reduction in power consumption realized by the FFT with the integrated half-bin offset may be important. Also, many GPS systems are small and thus the size of the FFT circuit may be important. In some cases, the FFT circuit with the integrated half-bin offset can be implemented on integrated circuits (e.g., ASICS) with nominal transistor sizes of 10 nm, 14 nm, 20 nm, etc. Furthermore, in GPS systems where size is a concern, since the FFT with the integrated half-bin offset is reduced in complexity and thus uses less power, a fewer number of heat sinking elements are required.

Referring now to FIG. 1, a four element FFT circuit 100 is shown, according to an exemplary embodiment. The circuit 100 receives inputs 102 and determines outputs 104. The inputs 102 may be data samples of an input signal, e.g., a signal received from a receiver and sampled by an analog input circuit. The input 102 includes samples 0-3, i.e., x(0), x(1), x(2), x(3), representing discrete real-valued samples of the signal over time. The output 104 are complex-valued samples representing frequencies of the sampled signal. The output 104 (which are in bit reverse order, also referred to as "decimation in frequency," where the indices are written in binary and then the binary value is reversed) includes outputs X(0), X(2), X(1), X(3), representing complex-valued samples of the frequency spectra of the sampled signal.

The circuit 100 is a radix $2^2$ FFT, in some embodiments. The radix $2^2$ FFT decomposition minimizes adder and memory required while maximizing multiplier utilization (i.e., using 100% of available circuit multipliers) and memory utilization. A radix $2^2$ FFT can utilize N−1 complex valued data memory elements and $\log_4$ N−1 complex multipliers, where N is the length of the FFT. The circuit 100, a four element FFT, is decomposed into radix $2^2$ butterflies, butterfly 108 and butterfly 110, a type I and a type II butterfly respectively. The butterflies 108 and 110 follow a signal flow graph where arrows entering a branch node (e.g., represented as a circuit in FIG. 1) are summed. Numbers or symbols along arrows are multiplicative factors on the particular path where the numbers or symbols are located. As an example, the third element calculated in the butterfly 108 is x(0)-x(2).

Furthermore, the circuit 100 is shown to include a twiddle stage multiplier 106. The twiddle stage multiplier can multiply the result of the butterfly 108 by coefficients before the result of the butterfly 108 is passed into the butterfly 110. The twiddle stage multiplier 106 multiplies by coefficients $W^0$ and −j.

$$W = e^{-\frac{2\pi i}{N}},$$

where N is the length of the FFT

Figure 2:
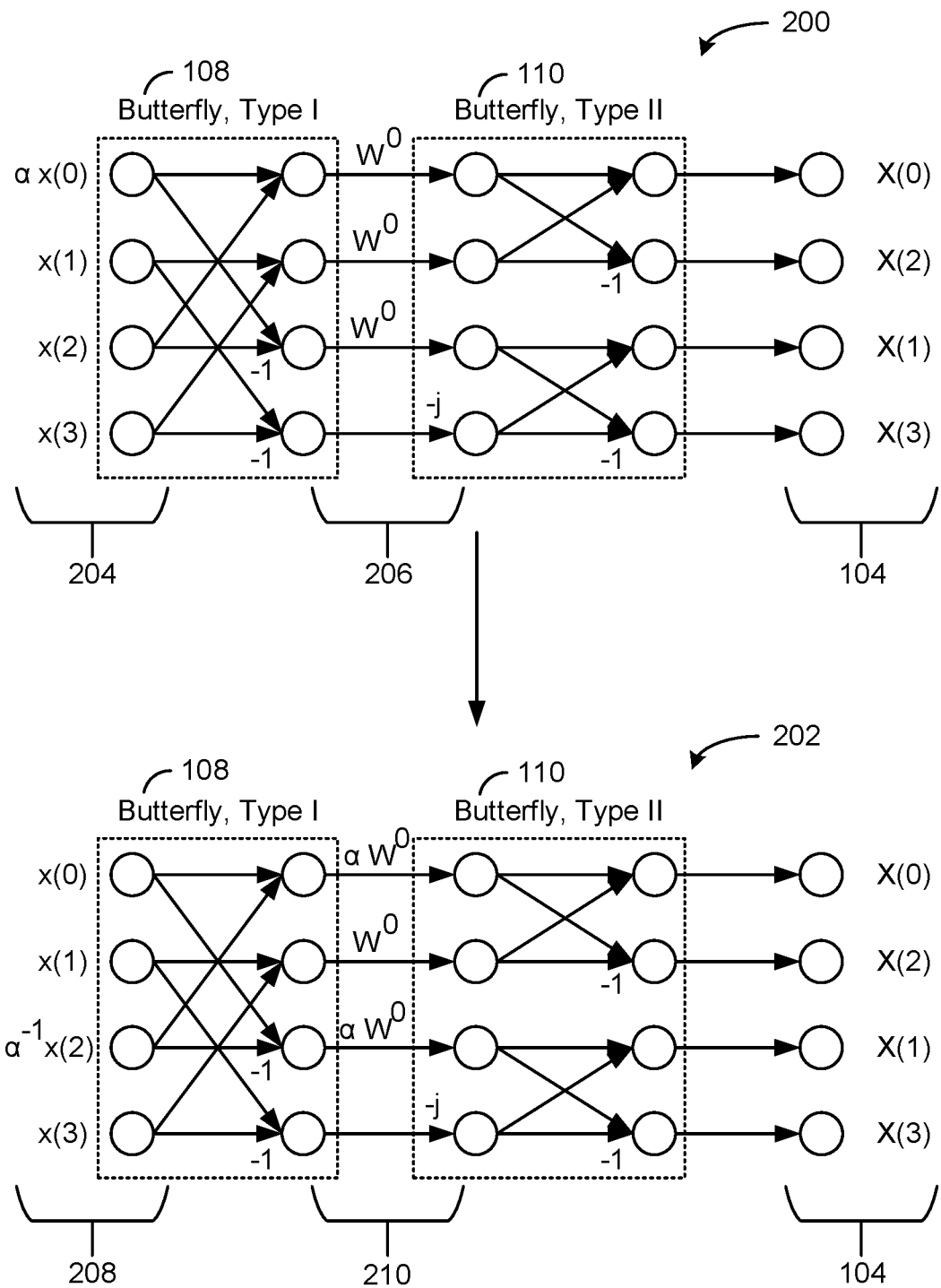
FIG. 2 is a circuit block diagram of two four element FFTs demonstrating distributive properties of multiplication through various stages of the two FFTs according to exemplary aspects of the inventive concepts disclosed herein.

Referring now to FIG. 2, a four element FFT circuit 200 and a four element FFT circuit 202 are shown, according to an exemplary embodiment. The circuits 200 and 202 are four element radix $2^2$ FFT illustrating an operation moving a from the first data input (the circuit 200) inside the circuit (the circuit 202). The multiplication and add definitions must follow appropriately, causing $\alpha^{-1}$ to reflect back out to x(2) when it is pulled in from x(0). Circuit 200 includes input 204 while circuit 202 includes input 208.

Circuits 200 and 202 are similar to the circuit 100 as illustrated in FIG. 1 and include twiddle multipliers 206 and 210 respectively. Multiplication factors of the circuits 200 and 202 can be moved left and right on the signal flow graph of circuits 200 and 202 while staying consistent with the mathematical definitions (e.g., without changing the output 104). An example is given in FIG. 2, where a multiplication factor α is moved from outside the butterfly 108 of circuit 200 into the first butterfly stage of circuit 202 without changing the output 104.

Furthermore, $\alpha^{-1}$ "reflects" out of the signal graph line to x(2) as a appears on third twiddle multiplication stages of twiddle multiplier 210 (and also appears on the first stage). This operation can be used to combine twiddle factors so that only $\log_4 N-1$ multipliers are required for a radix $2^2$ FFT. Furthermore, the integration of a half-bin offset into the FFT can rely on the fact that coefficients for the half-bin offset can be brought into the FFT instead of being outside the FFT.

Figure 3:
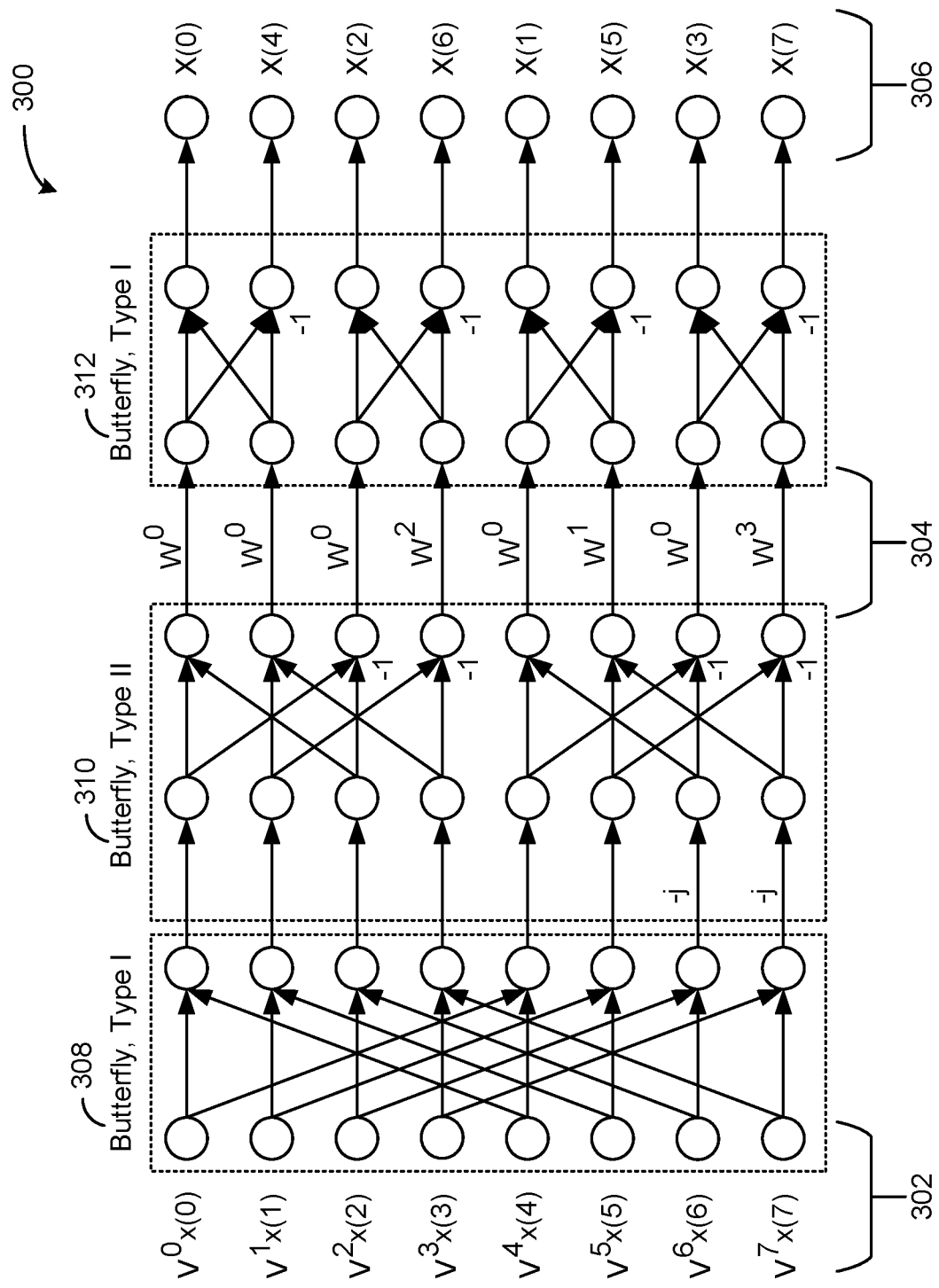
FIG. 3 is a circuit block diagram of an eight element FFT with a half-bin offset implemented before the FFT according to exemplary aspects of the inventive concepts disclosed herein.
Figure 4:
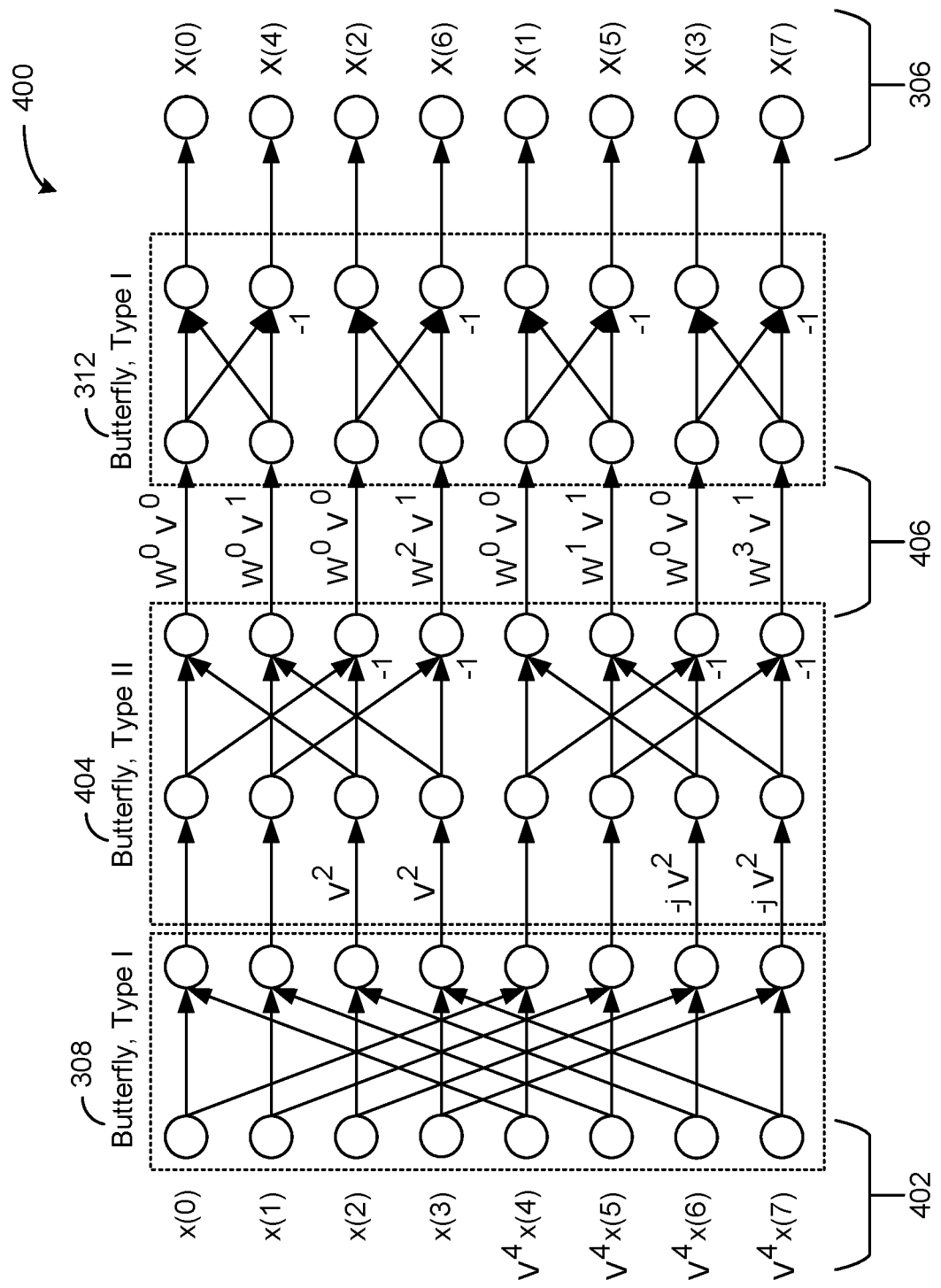
FIG. 4 is a circuit block diagram of the eight element FFT illustrated in FIG. 3 with the half-bin offset integrated inside the FFT where the half-bin offset is brought into a twiddle multiplication stage of the eight element FFT according to exemplary aspects of the inventive concepts disclosed herein.

Referring now to FIGS. 3-4, eight element FFT circuits are shown where circuit 300 includes a half-bin offset and an eight element FFT while the circuit 400 includes the half-bin offset integrated within the eight element FFT, according to various exemplary embodiments. The circuit 300 includes multipliers $V^i$ on input 302 which is fed into butterfly 308 which may be a Type I butterfly, implementing a half-bin offset. The output of butterfly 308 is passed through butterfly 310 which may be a Type II butterfly. The output of the butterfly 310 is passed through twiddle stage multiplier 304 which is then passed through butterfly 312 (which may be a Type I) butterfly while finally generating output 306. The elements of circuit 300 may be similar to the elements of circuit 100, e.g., the input 302 may be similar to the input 102, the butterfly 308 may be similar to the butterfly 108, etc.

Referring particularly to FIG. 4, the circuit 400 illustrates an eight element FFT with the half-bin offsets of circuit 300 brought into a twiddle stage of the circuit 400, twiddle stage multiplier 406. Furthermore, input 402 of the circuit 400 differs from the input 302 of the circuit 300 where in circuit 400, x(0)-x(3) are not multiplied by any $V^i$ while x(0)-x(3) are multiplied by $V^4$. However, in comparing circuit 300 and 400, even though the multiplication of $V^i$ are different, there are symmetries (symmetries similar to the symmetries as demonstrated in FIG. 2) between the first and second stages, i.e., $V^i$ on the input 302 is brought into the butterfly 404 and twiddle stage multiplier 406 of circuit 400.

Referring generally to FIGS. 3-4, the FFT for a discrete data sequence f (n) of length N can be, $$\hat{f}(k) = \sum_{n=0}^{N} f(n)e^{-2\pi i k n/N} \qquad \text{(Equation 2)}$$

The half-bin offset, $V \equiv e^{-2\pi i/2N}$, is applied to each element in the data sequence such that $f(n) \to e^{2\pi i/2N} f(n) = V^n f(n)$. Then, the Fourier transform with a half-bin offset becomes, $$\hat{f}(k+k/2) = \sum_{n=0}^{N} V^n f(n)e^{-2\pi i k n/N} \qquad \text{(Equation 3)}$$

As mentioned, circuit 300 is an eight element FFT with a half-bin offset although the half-bin is not integrated within the FFT. Applying the operation outlined with respect to FIG. 2 to pull in the half-bin offset coefficients, and repeating it to pull them in to the first twiddle stage, the result is circuit 400, an eight element FFT with the half-bin offset integrated within the FFT. By performing this integration, the half-bin coefficients are moved into the first twiddle stage of the circuit 300, the twiddle stage multiplier 406. This can be done for any length FFT, as a typical radix 2 or $2^2$ butterfly decomposition always has a major twiddle stage after the first two butterflies. At this point, in hardware, a look-up table (e.g., a look-up table of look-up memory 628 of FIG. 6) can include the modified values of V (coefficients for the half-bin offset) and W (coefficients for the FFT) rather than just the twiddle values W. In some embodiments, the look-up memory 628 of FIG. 6 includes single coefficients, the single coefficients integrating both V and W values together.

However, after this operation of integrating the half-bin offset with the FFT, the input to the butterfly 308 has $V^{N/2}$ (in FIG. 4 N=8 and thus $V^{N/2}=V^4$) on the latter half of the data sequence and the input to the butterfly 404 has $V^{N/4}$ on the second half of each stage (in FIG. 4 N=8 and thus $V^{N/4}=V^2$). However, the properties of V illustrate that the integration of circuit 400 is computationally less complicated than four full quadrant multiplier as would be required for circuit 300. First, $$V^{N/4} = e^{-2\pi i/8} = 1/\sqrt{2}(1-i) \qquad \text{(Equation 4)}$$

and $1/\sqrt{2}$ can be approximated using a canonical signed digit (CSD) multiplier and an eight-bit right shift to multiply by 181/256, which is within 0.02% of $1/\sqrt{2}$.

Next, the $V^{N/2}$ stage is $V^{N/2} = e^{-2\pi i/4} = -j$, which can be accomplished with simple logic routing of the signal. Thus, by adjusting the look-up tables on the first twiddle stage (twiddle stage multiplier 406), adding logic for a CSD multiplier to the input of butterfly 404, and signal routing for $-j$ as implemented by butterfly 308, a half-bin offset is integrated within the FFT. In FIG. 4, N=8 and therefore, $V = e^{-2\pi i/(2N)} = e^{-\pi i/8}$. More specifically, $V^4$ of input 402 can reduce to $-j$, i.e., $V^4 = e^{-4\pi i/8} = e^{-\pi i/2} = -j$ which can be implemented with signal rerouting in butterfly 308. $V^2$ of the inputs to butterfly 404 reduce to $$\frac{1}{\sqrt{2}}(1-j), \text{ i.e., } V^2 = e^{-\pi i/4} = \frac{1}{\sqrt{2}}(1-j)$$

which can be implemented with signal re-routing and the CSD multiplier.

For both circuits 300 and 400, hardware additions are required to implement the half-bin offset. The multiplication of the inputs with half-bin offset terms as implemented in circuit 300, uses four fully configurable Booth multiplication algorithms. The circuit 400 is configured to utilize two CSD constant integer multipliers by 181, a unary minus, two adders, two bit-shifters, and an additional lookup table in the twiddle stage. Thus, circuit 400 only uses half of the multipliers as circuit 300 and these multipliers are much smaller. Furthermore, the bit-shifters of circuit 400 are negligible through logic routing. Therefore, the circuit requirements of circuit 400 are greatly reduced in view of circuit 300.

Figure 5:
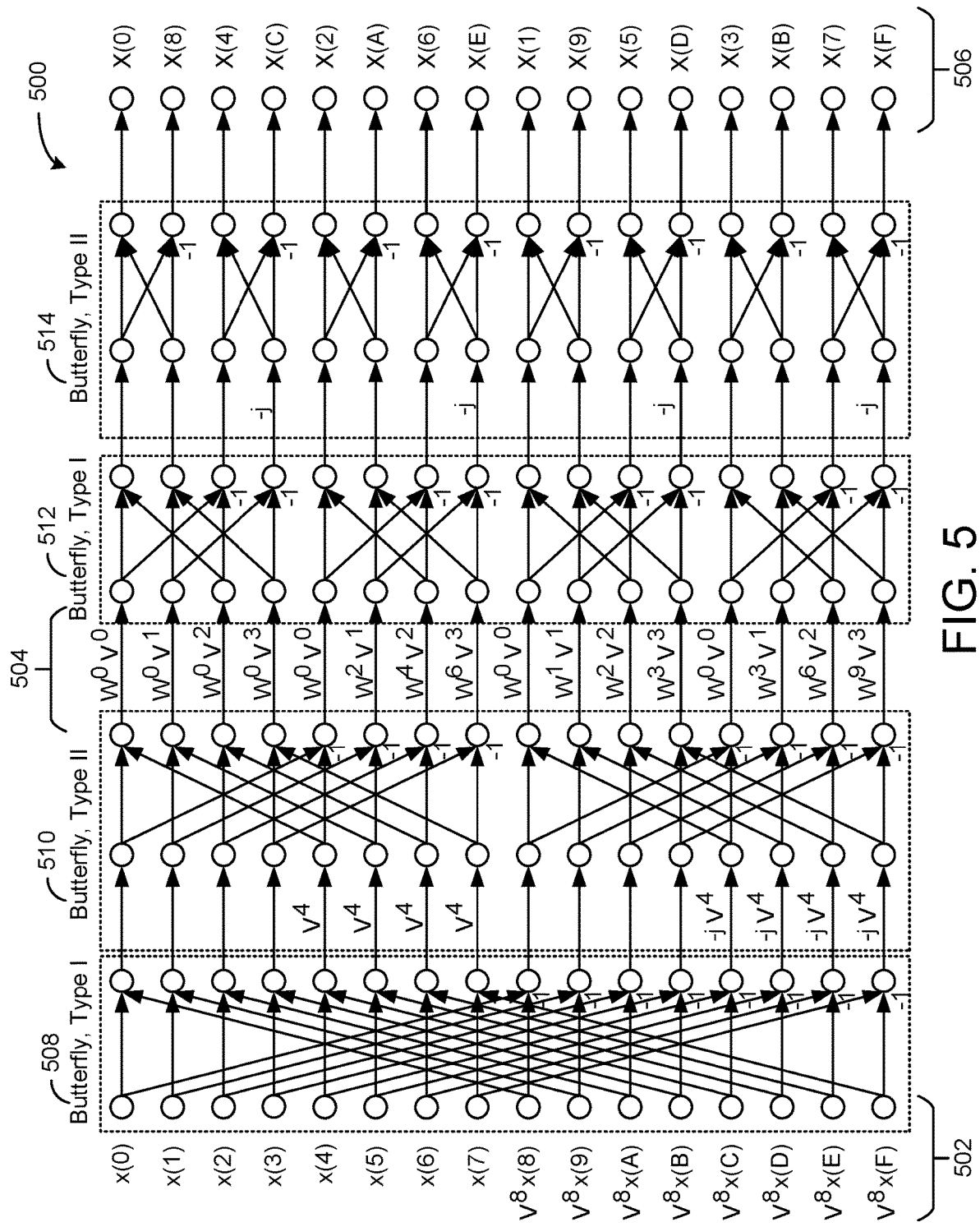
FIG. 5 is a circuit block diagram of a sixteen element FFT with an integrated half-bin offset, the half-bin offset brought into a twiddle multiplication stage of the sixteen element FFT according to exemplary aspects of the inventive concepts disclosed herein.

Referring now to FIG. 5, a sixteen element FFT circuit 500 with an integrated half-bin offset where the half-bin offset brought into a twiddle stage multiplier 504 is shown, according to an exemplary embodiment. The first and second stages of circuit 500, similar to circuit 400, have factors of $V^8 = -j$ and $V^4 = (1-i)/\sqrt{2}$ respectively. Circuit 500 includes input 502 and output 506 which may be similar to the input 102 and the output 104. Furthermore, circuit 500 includes butterflies 508, 510, 512, and 514 where butterflies 508 and 512 are Type I and butterflies 510 and 514 are Type II, in some embodiments.

The circuit 500 was simulated in MATLAB. The operation of the circuit 500 without regard to hardware specifics was tested using MATLAB functions implementing each butterfly stage, the $V^8 = -j$, $V^4 = (1-i)/\sqrt{2}$ factors, and the modified twiddle stages. The result of the simulation agreed within machine epsilon with the built in FFT function of MATLAB with a traditional half-bin offset multiplier. Furthermore, a model (which may be the same as or similar to the circuit shown in FIG. 6) was made using Simulink, with exclusively HDL Coder compatible blocks to simulate the circuit 500. This was tested using a 16 element single delay feedback radix $2^2$ algorithm.

Figure 12:
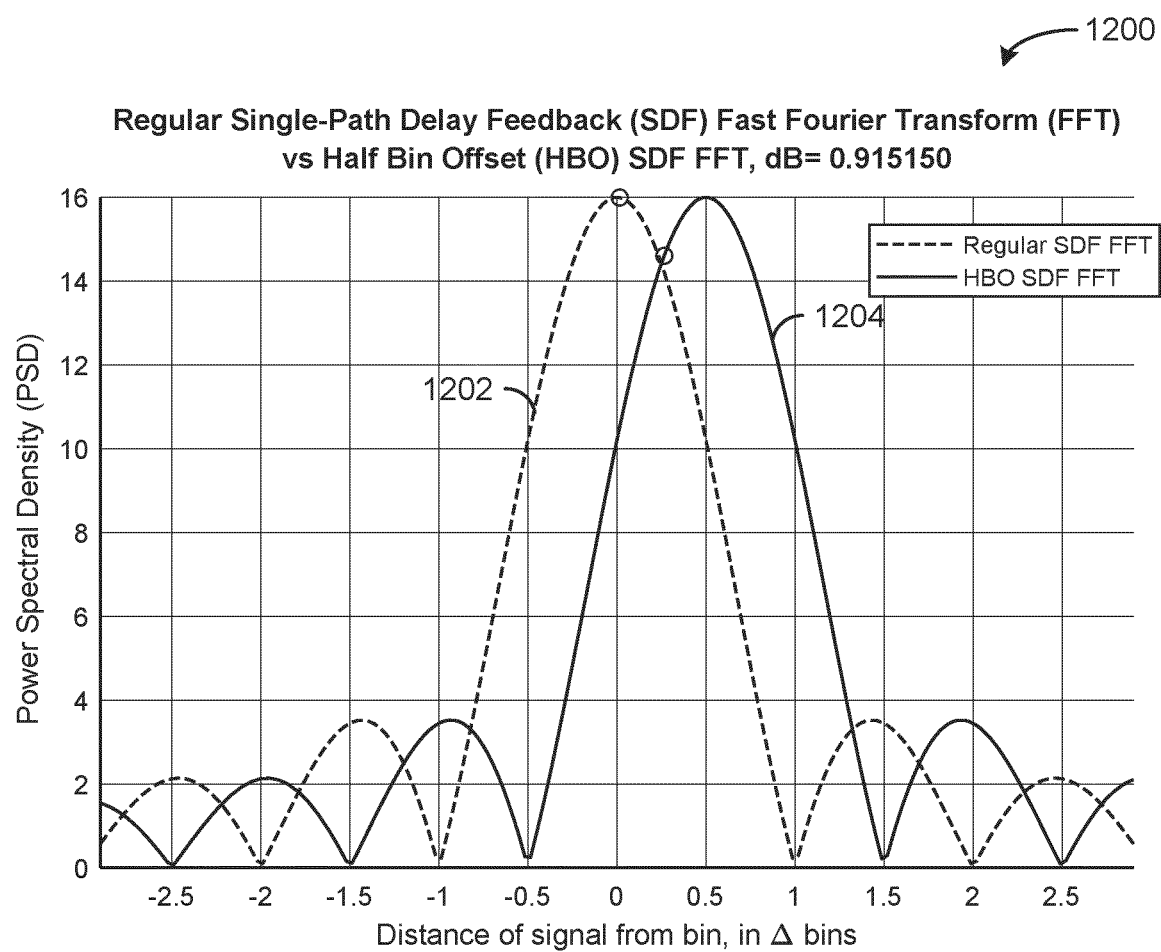
FIG. 12 is a graph illustrating power spectral density (PSD) of a regular FFT and an FFT with an integrated half-bin offset according to exemplary aspects of the inventive concepts disclosed herein.

The Simulink model was simulated with an input signal for 512 separate FFTs, while the input signal was walked across frequency. The spectral leakage of this compared with a regular FFT was plotted, giving the expected 0.9 dB of loss when the two spectral leakage plots are superposed, this result is shown in FIG. 12.

The circuit 500 is configured to implement both an FFT and a half-bin offset, in some embodiments. Specifically, butterfly 508 is configured to implement calculations for the FFT and also calculations for the half-bin offset. The summation and multiplication by −1 (as shown by the butterfly graph in FIG. 5) of the butterfly implements the FFT while the multiplication by $V^8$ implements the half-bin offset. Furthermore, the butterfly 510 is configured to implement another set of calculations for both the FFT and the half-bin offset, specifically, the butterfly 510 is configured to implement summation between signals and multiplication by −1 and −j (as shown by the butterfly graph in FIG. 5) while also being configured to implement calculations for the half-bin offset, i.e., multiplication by $V^4$. Furthermore, the twiddle stage multiplier 504 is configured to implement more calculations for both the FFT and the half-bin offset. Multiplication by powers of W implement calculations for the FFT while multiplication by powers of combinations of W and V implement calculations of the FFT and the half-bin offset (e.g., as shown in FIG. 5). Butterfly 514 and/or butterfly 514 are configured to implement calculations for the FFT as illustrated by the butterfly graph of FIG. 5.

Figure 6:
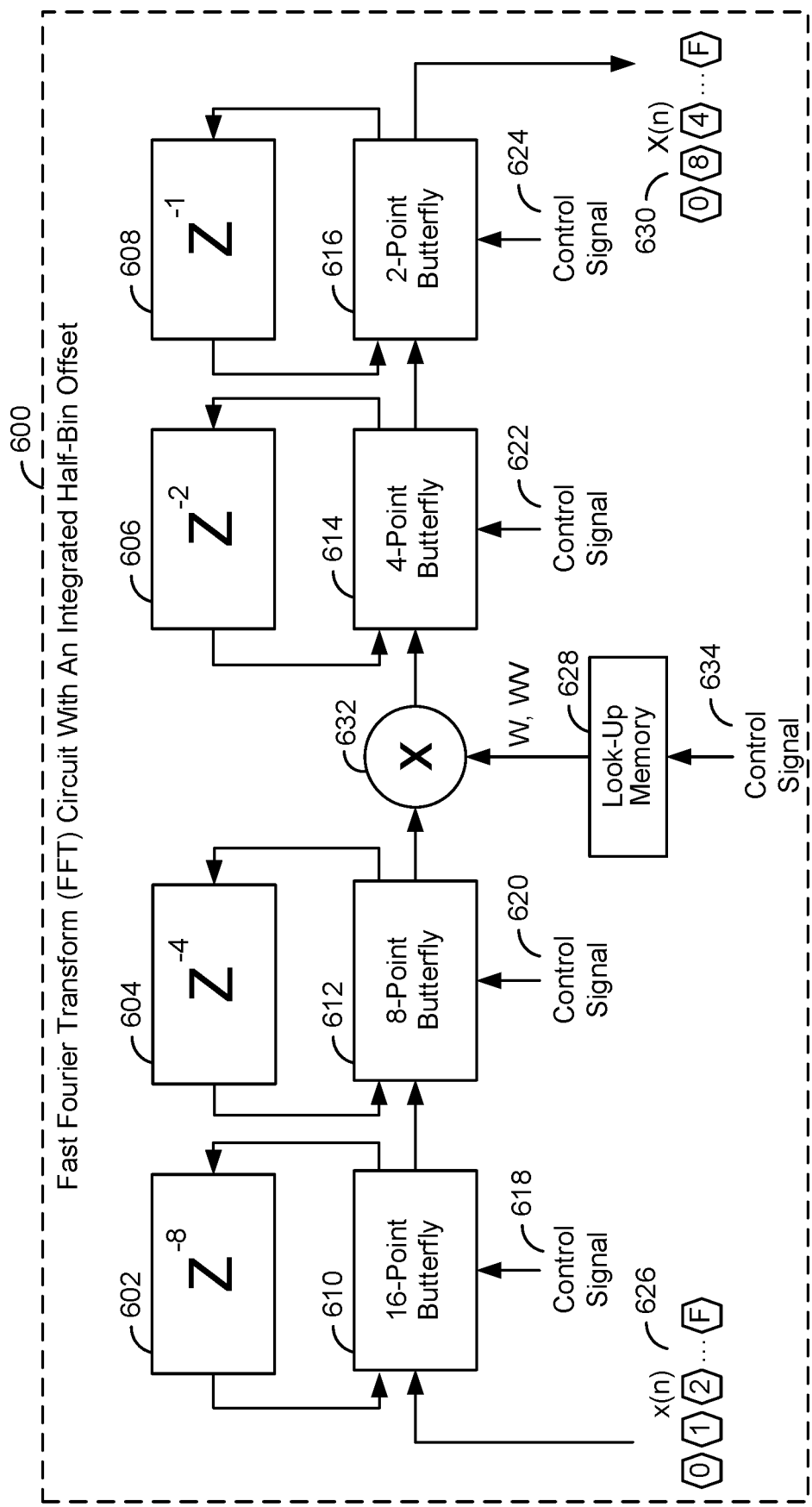
FIG. 6 is a circuit block diagram of a sixteen element FFT with an integrated half-bin offset, the sixteen element FFT including a sixteen point butterfly, an eight point butterfly, a four point butterfly, a two point butterfly, and look-up memory for the half-bin offset according to exemplary aspects of the inventive concepts disclosed herein.

Referring now to FIG. 6, a FFT circuit 600 with an integrated half-bin offset is shown, according to an exemplary embodiment. The circuit 600 is one of various possible implementation of a FFT with an integrated half-bin offset as a hardware implementation of a single feedback FFT algorithm. The circuit 600 can be the same as and/or similar to the circuit 500. The circuit 600 includes a sixteen point butterfly 610, an eight point butterfly 612, a four point butterfly 614, a two point butterfly 616, and look-up memory 628 for the half-bin offset. Each of the butterflies 610-616 include a feedback delay block, delays 602-608. The butterflies 610-616 and delay blocks 602-608 may be logic circuits configured to implement calculations for both an FFT and a half-bin offset. The operation of each of the butterflies 610-616 and the look-up memory 628 can be controlled by the circuit 600 by generating values (e.g., binary values) for control signals 618-624 and 634 which can each be one or multiple signals.

The circuit 600 is configured to receive an input 626 which may be sixteen real valued samples of an input signal and generates an output 630 which may be sixteen complex signals representing the frequency spectra of the sampled input signal. The first two butterflies 610 and 612, which may be BFIA and BFIIA, are configured to implement the −i and $(1-i)/\sqrt{2}$ factors, respectively.

The circuit 600 may be an implementation of the circuit 500 and therefore, the butterflies 610-616, an input 626, an output 630, and a twiddle stage multiplier of the circuit 600 may be the same as and/or similar to the butterflies 508-514, the input 502, the output 506, and the twiddle stage multiplier 504 as described with reference to FIG. 5 in the circuit 500. The look-up memory 628 is configured to store W and/or WV values and provide the values to the twiddle stage multiplier 632. In some embodiments, the look-up memory 628 is read only memory (ROM) and provides the W and WV factors to the twiddle stage multiplier 504 based on a values of control signal 634 which can be generated by the FFT circuit 600.

The circuit 600 may include at least one processor, which may be any type of general purpose or special purpose processor (e.g., FPGA, CPLD, ASIC). The circuit 600 can also include at least one memory (e.g., look-up memory 628), which may be any type of non-transitory computer or machine-readable storage medium (e.g., ROM, RAM, hard disk, flash memory) and may store information in look-up tables and/or any other type of storage structure.

Figure 7:
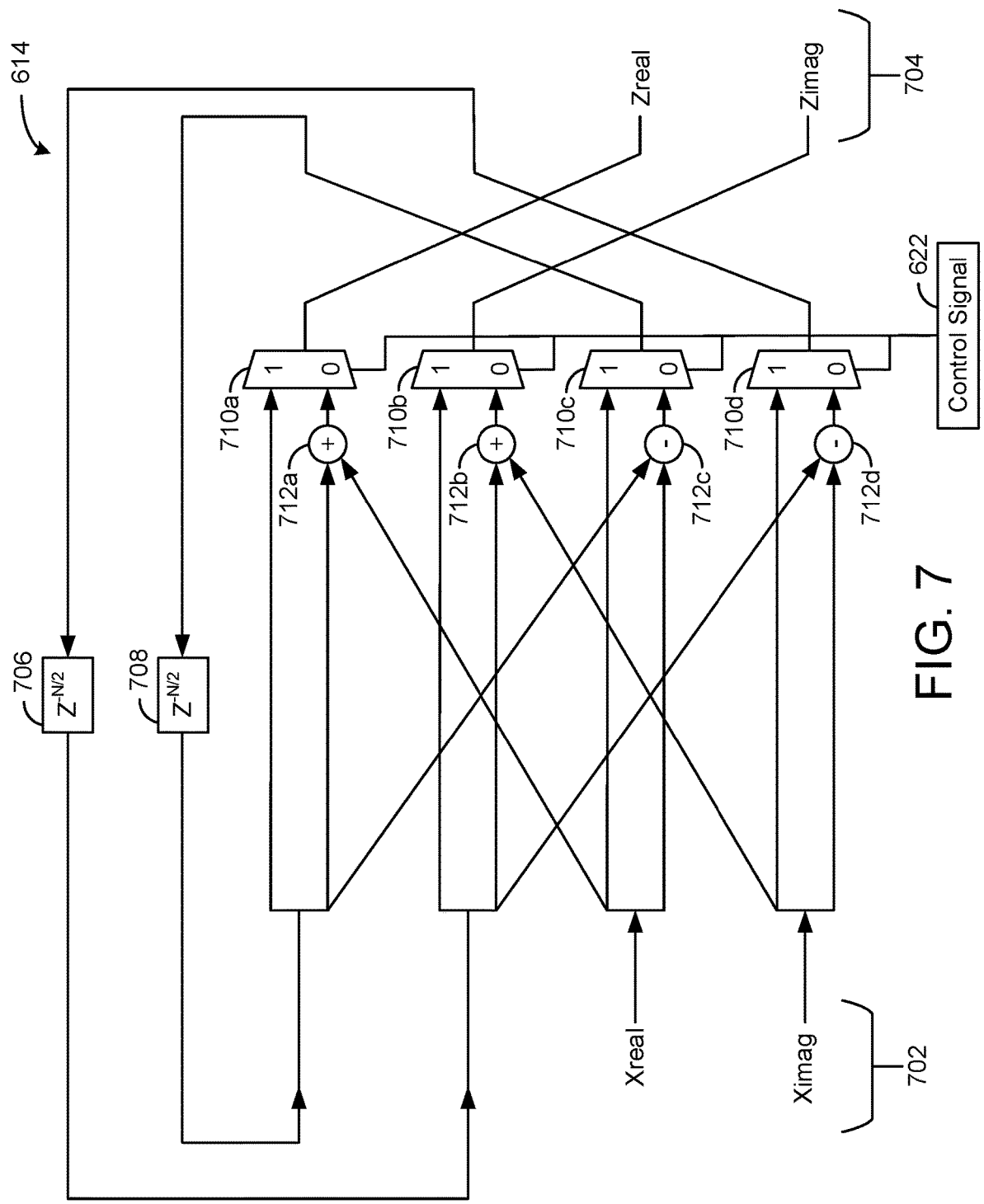
FIG. 7 is a circuit block diagram of a type I butterfly that can be implemented as the four point butterfly of the sixteen element FFT with the integrated half-bin offset illustrated in FIG. 6 according to exemplary aspects of the inventive concepts disclosed herein.
Figure 8:
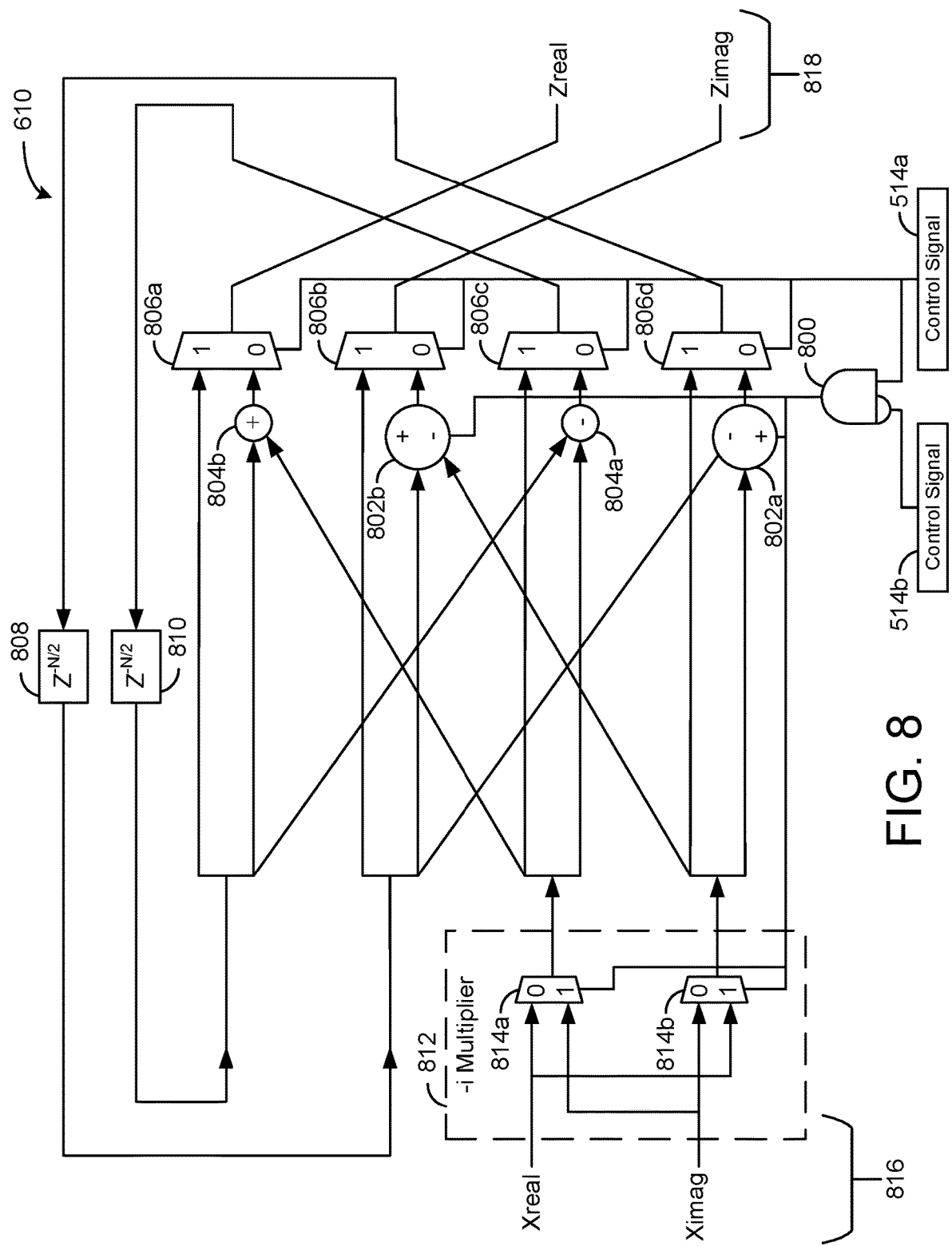
FIG. 8 is a circuit block diagram for a type I butterfly or a type II butterfly that can be implemented as the sixteen point butterfly or the two point butterfly of the sixteen element FFT with the integrated half-bin offset illustrated in FIG. 6 according to exemplary aspects of the inventive concepts disclosed herein.
Figure 9:
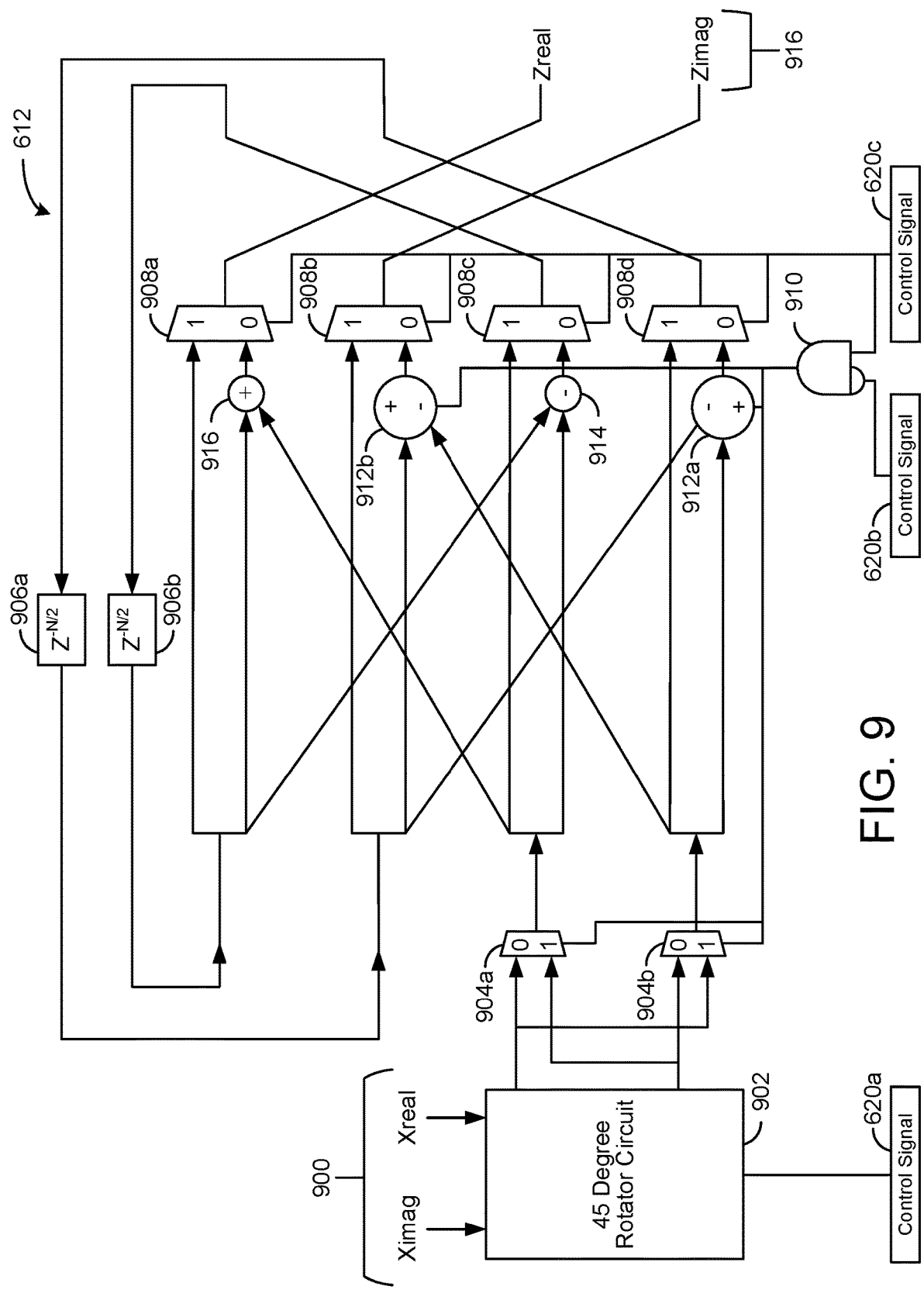
FIG. 9 is a circuit block diagram of a type II butterfly including a rotator circuit that can be implemented as the eight point butterfly of the sixteen element FFT with the integrated half-bin offset illustrated in FIG. 6 according to exemplary aspects of the inventive concepts disclosed herein.

Referring generally to FIGS. 7-9, butterfly circuits are shown for type I and type II butterflies. Each of the butterfly circuits of FIGS. 7-9 include feedback memory, represented as −Z blocks with N/2. The butterfly length (e.g., 16 point butterfly, 8 point butterfly, 4 point butterfly, etc.) is not determined by the shape and/or operation of the butterfly circuit in some embodiments, but instead by the number of elements in the feedback memory, i.e., the value of N. In this regard, the butterfly circuits of FIGS. 7-9 can be designed once and instantiated multiple times to implement varying sizes of butterfly circuits for various sizes of an FFT while the operations of the butterfly circuits themselves can remain constant. For example, referring to FIG. 1 and FIG. 6, the four point butterfly circuit 614 can be the exact same or similar hardware as the butterfly circuits 108 and 110 with the only difference being the feedback memory, i.e., adjusting the value of N of the N/2 memory.

Referring now to FIG. 7, the four point butterfly 614 is shown in greater detail, according to an exemplary embodiment. The butterfly 614 is configured to receive an input 702 which can include real and imaginary components and generate an output 704. Rather than performing the operations of the four point butterfly 614 on all x(0)-(F) signals simultaneously, the butterfly 614 is configured to perform the operations on each of x(0)-(F) sequentially, i.e., one at a time.

The butterfly 614 includes delays 706 and 708 which are configured to perform a signal delay, in some embodiments. Since the butterfly 614 is a four point butterfly, the delay 706 shown as $Z^{-N/2}$ reduces to $Z^{-2}$. This is similar to the delay 708. The butterfly 614 includes multiplexers 710a-710d which are configured to select one of two inputs based on a value of the control signal 622, in some embodiments. The inputs into the multiplexers 710a-710b can be an output of multiplexers 710c and 710d fed back through the delays 706 and 708, the input 702, and a combination (e.g., sum or difference) of the input signals 702, the signals fed back through the delays 706 and 708. Summers 712a and 712b are configured to perform the sum of signals fed into multiplexers 710a and 710b while difference operations 712c and 712d are configured to perform a difference of signals fed into multiplexers 710c and 710c, in some embodiments.

The butterfly 614 is configured, in some embodiments, to perform the butterfly 512 illustrated in FIG. 5. As illustrated in FIG. 5, the butterfly 614 and/or the butterfly 512 can be configured to sum an input signal corresponding to x(0) with an input signal corresponding to x(2), sum an input signal corresponding to x(1) with an input signal corresponding to x(3), subtract an input signal corresponding to x(2) from an input signal corresponding to x(0), and subtract an input signal corresponding to x(3) from an input signal corresponding to x(1) to give resulting values to pass into a subsequent butterfly. The butterfly 614 and/or the butterfly 512 are configured to perform similar operations on input signals corresponding to x(4)/x(7), x(8)-x(B), and x(C)-x(F). The "corresponding" input signals to x(0)-x(F) refers to the signals input into the butterfly 512 from the twiddle stage multiplier 504 that appear on the same line as the inputs 502 instead of the actual input signals 502.

Referring now to FIG. 8, the sixteen point butterfly 610 is shown in greater detail, according to an exemplary embodiment. In some embodiments, the butterfly 610 of FIG. 8 can also be used to implement a two point butterfly, e.g., the butterfly 616 (the butterfly 514). The butterfly 610 is configured to receive an input 816 which can include real and imaginary components and generate an output 818. Rather than performing the operations of the butterfly 610 on all x(0)-(F) signals simultaneously, the butterfly 610 is configured to perform the operations on each of x(0)-(F) sequentially, i.e., one at a time. Since the butterfly 610 is the first butterfly of the FFT circuit 600, the input 816 may directly correspond to the input 626. Since the input 626 are direct samples of a signal for which the FFT circuit 600 is configured to generate the FFT for, the imaginary portion of the input 816 may be negligible.

The butterfly 610 includes an −j multiplier 812. The −j multiplier 812 is configured to multiply the input signal 816 by −j, in some embodiments. The butterfly 610 is configured to receive control signal 514a and 514b. Based on the control signals 514a-b, the multiplier 812 is configured to apply, or not apply, multiplication of the input 816 by −j. Referring in part to FIG. 5, the half of the inputs 502 are shown to not be multiplied by $V^8$, x(0)-(7), while the other half of the inputs 502 are shown to be multiplied by $V^8$, x(8)-(F). $V^8$ reduces to −j in the FFTs shown in FIGS. 5 and 6 and therefore, the FFT circuit 600 is configured to generate the control signals 514a-514b such that the −j multiplier 812 is configured to apply no multiplication of input signals x(0)-(7) by −j but is configured to apply a multiplication of −j to input signals x(8)-(F), in some embodiments. The −j multiplier 812 includes multiplexers 814a and 814b which are configured to receive the input signals 816 and be operated by the control signals 514a-514b to perform, or not perform, the multiplication of −j, in some embodiments.

The butterfly 610 is shown to include multiplexers 806a-806d, subtraction block 804a, summation block 804b, and add and subtraction blocks 802a and 802b. The outputs of multiplexers 806b and 806d are fed through delay blocks 808 and 810 and back into the operator and multiplexer blocks 806a-806d, 804a, 804b, 802a, and 802b as shown in FIG. 8. Since the butterfly 610 is a sixteen point butterfly, the delays 808 and 810 shown as $Z^{-N/2}$ reduce to $Z^{-8}$, in some embodiments.

Referring to FIG. 5 and FIG. 8, the butterfly 610 is configured to perform the operations visually illustrated by the butterfly 508 shown in FIG. 5. After multiplying the input signals 502, in part by −j as described, the butterfly 610 is configured to utilize delay blocks 808 and 810, the multiplexers 806a-806d, the summation block 804b, the subtraction block 804a, the operator blocks 802a and 802b, the control signals 514a and 514b (after being passed through an and gate 800 with the control signal 514b first passing through a not gate before entering the and gate 800 which are fed into the operator blocks 802b and 802a) to perform the summation and subtraction illustrated visually in the butterfly 508 of FIG. 5, in some embodiments.

The butterfly 610 and/or the butterfly 508 are configured to sum the input x(0) with the input $V^8$x(8), sum the input x(1) with the input $V^8$x(9), sum the input x(2) with the input $V^8$x(A), sum the input x(3) with the input $V^8$x(B), sum the input x(4) with the input $V^8$x(C), sum the input x(5) with the input $V^8$x(D), sum the input x(6) with the input $V^8$x(E), and/or sum the input x(7) with the input $V^8$x(F), in some embodiments. Furthermore, the butterfly 610 and/or the butterfly 508 are configured to subtract the input $V^8$x(8) from the input x(0), subtract the input $V^8$x(9) from the input x(1), subtract the input $V^8$x(A) from the input x(2), subtract the input $V^8$x(B) from the input x(3), subtract the input $V^8$x(C) from the input x(4), subtract the input $V^8$x(D) from the input x(5), subtract the input $V^8$x (E) from the input x(6), and/or subtract the input $V^8$x(F) from the input x(7), in some embodiments.

Referring now to FIG. 9, the eight point butterfly 612 is shown in greater detail, according to an exemplary embodiment. The butterfly 612 is configured to receive an input 900 which can include real and imaginary components and generate an output 916 which also has real and imaginary components, in some embodiments. Rather than performing the operations of the butterfly 612 on all x(0)-(F) signals simultaneously, the butterfly 612 is configured to perform the operations on each of x(0)-(F) sequentially, i.e., one at a time, in some embodiments. Since the butterfly 612 is the second butterfly of the FFT circuit 600, the input 900 may directly correspond to the output 818 of FIG. 8.

The butterfly 612 includes a 45 degree rotator circuit 902. The 45 degree rotator circuit 902 can be configured to multiply the input 900 by $(1-j)/\sqrt{2}$. A rotation by 45 degrees corresponds, in the imaginary plane, to $(1-j)/\sqrt{2} \approx 0.707 - j0.707$ which is the reduction of $V^4$ for the circuit 600 of FIG. 6. Referring to FIG. 5 and FIG. 9, the input signals corresponding to x(4)-(7) and x(C)-(F) and which are output from the butterfly 508, can be multiplied by $V^4$, which corresponds to the FFT circuit 600 configured to operate 45 degree rotator circuit 902 via control signal 620a to implement multiplication of the signals x(4)-(7) by $(1-j)/\sqrt{2}$. Regarding (C)-(F), FIG. 5 illustrates the signals multiplied not only by $V^4$, but also by −j, which in total is $-jV^4$. As the butterfly 612 is configured, in some embodiments, to operate the 45 degree rotator circuit 902 to implement the multiplication by $(1-j)/\sqrt{2}$, the butterfly 612 is configured, via the control signals 620b and 620c, to operate multiplexers 904a and 904b to implement the multiplication by −j, in some embodiments.

The butterfly 612 includes delays 906a and 906b. Since the butterfly 612 is an eight point butterfly, the delays 906a and 906b shown as $Z^{-N/2}$ reduce to $Z^{-4}$, in some embodiments. The butterfly 612 further includes multiplexers 908a-908d, summation block 916, subtractor 914, and summation and subtraction blocks 912b and 912a. These components, in addition to the multiplexers 904a-904b, can be controlled by the control signals 620b and 620c, passed through an and gate 910 where the control signal 620b is first passed through a not gate, to implement the butterfly 510 computations visually illustrated in FIG. 5, in some embodiments.

As mentioned, the butterfly 612 is configured to implement multiplication by $V^4$ and $-jV^4$ by setting a particular value for control signal 620a, in some embodiments. Once the multiplication is performed, the butterfly 510 is configured to set values for the control signals 620b and 620c to perform addition and subtraction between signals corresponding to x(0)-x(F) output from the butterfly 610. Referring to FIG. 9 and FIG. 5, the butterfly 612 and/or the butterfly 510 are configured to add the signal corresponding to x(0) with the signal corresponding to x(4) multiplied by $V^4$, add the signal corresponding to x(1) with signal corresponding to x(5) multiplied by $V^4$, add the signal corresponding to x(2) with signal corresponding to x(6) multiplied by $V^4$, add the signal corresponding to x(3) with the signal corresponding to x(7) multiplied by $V^4$, subtract the signal corresponding to x(4) multiplied by $V^4$ from the signal x(0), subtract the signal x(5) multiplied by $V^4$ from the signal x(1), subtract the signal x(6) multiplied by $V^4$ from the signal x(2), and/or subtract the signal x(7) multiplied by $V^4$ from the signal x(3), in some embodiments. The "corresponding" input signals to x(0)-x(F) refers to the signals output from the butterfly 508 (or the butterfly 610) and input into the butterfly 510 (or the butterfly 612) that appear on the same line as the inputs 502 instead of the actual input signals 502.

Figure 10:
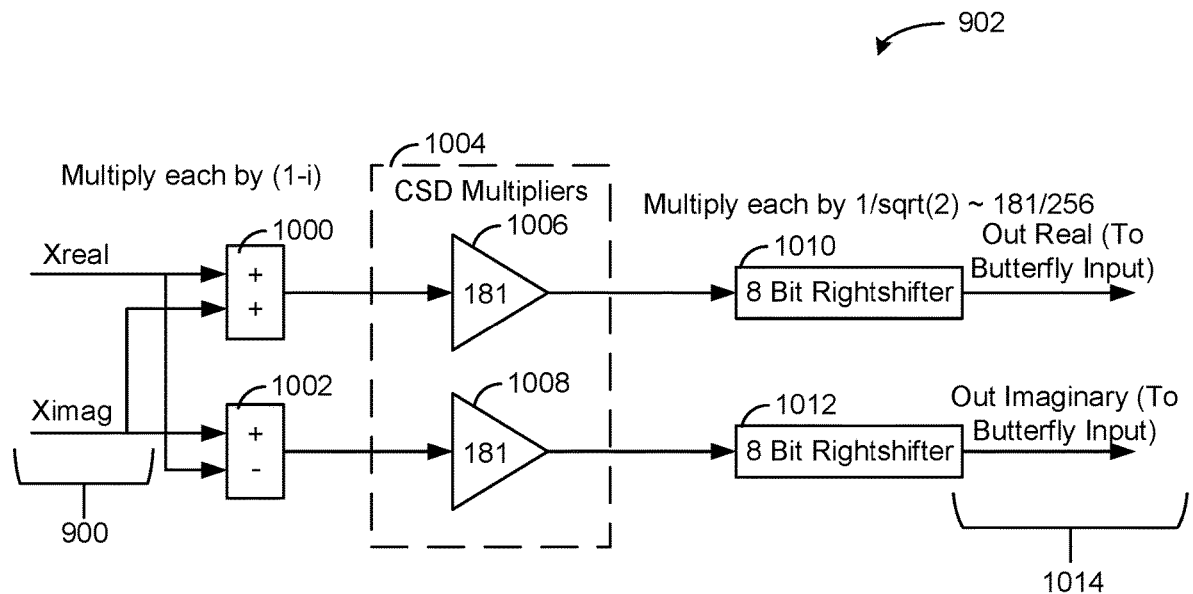
FIG. 10 is a circuit block diagram of the rotator circuit of the eight point butterfly of FIG. 9 including two canonical signed digit (CSD) multiplier circuits according to exemplary aspects of the inventive concepts disclosed herein.

Referring now to FIG. 10, the 45 degree rotator circuit 902 is shown in greater detail, according to an exemplary embodiment. As previously mentioned, the 45 degree rotator circuit 902 is configured to multiply the input 900 by $(1-j)/\sqrt{2}$, in some embodiments. The circuit 902 includes adder 1000 and addition and subtraction block 1002. Adder 1000 is configured to add the real component of the input 900 with the imaginary component while the block 1002 is configured to subtract the real component of the input 900 from the imaginary component of the input 900, this creates a multiplication of the input 900 by the 1-j of the overall computations of the circuit 902 to perform $(1-j)/\sqrt{2}$.

As the adder 1000 and the block 1002 are configured to implement the multiplication by (1-j), CSD multipliers 1004 and bit shifters 1010 and 1012 are configured to implement the multiplication by $1/\sqrt{2}$. $1/\sqrt{2}$ is approximately 181/256. The CSD multipliers 1004, i.e., multiplier 1006 and 1008, are configured to multiply the signal by 181 while the bit shifters 1010 and 1012 are configured to divide the signal by 256. Since the input 900 is made up of two components, a real component and an imaginary component, there are two multipliers, the multipliers 1006 and 1008 and two bit shifters, the bit shifters 1010 and 1012 to generate the outputs 1014 which are real and imaginary. In some implementations, the precision of 181/256 is not sufficient precision for a particular application of the FFT with the integrated half-bin offset. In this regard, a similar process for implementing $1/\sqrt{2}$ with CSD multipliers and/or bitshifters can be applied for different a numerator and/or denominator, where the CSD multipliers could be configured to implement the numerator and the bitshifters could be configured to implement the denominator.

Figure 11:
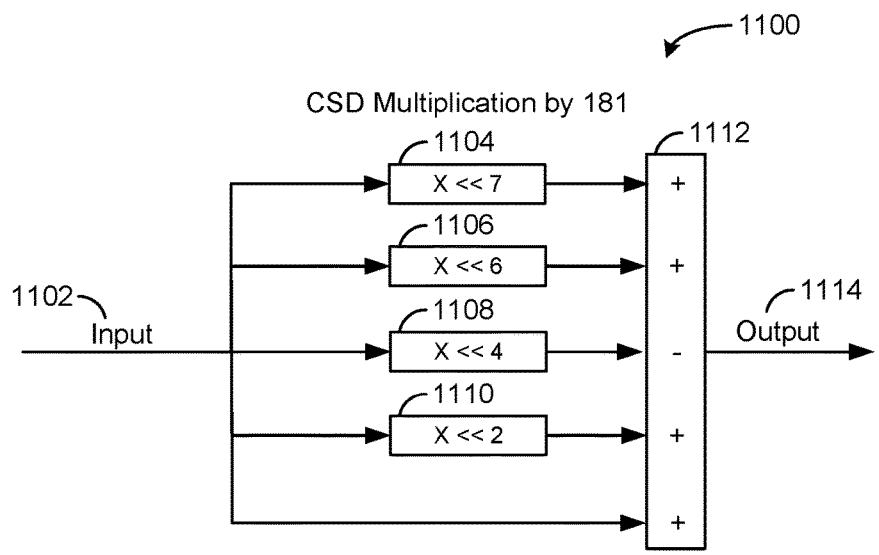
FIG. 11 is a block diagram of one of the two CSD multiplier circuits of the rotator circuit illustrated in FIG. 10 according to exemplary aspects of the inventive concepts disclosed herein.

Referring now to FIG. 11, one of the two CSD multipliers 1004 is shown in greater detail, according to an exemplary embodiment. The CSD multiplier of FIG. 11, is CSD multiplier 1100. The CSD multiplier 1100 is configured to receive input 1102 which may correspond to either the output of the adder 1000 and/or the addition and subtraction block 1002. The CSD multiplier 1100 includes four left bitshifters, a shift by seven bitshifter 1104, a shift by six bitshifter 1106, a shift by four bitshifter 1108, and a shift by 2 bitshifter 1110. The result of the shift of each of the bitshifters 1104-1110 is summed or subtracted by the summation and subtraction block 1112 to generate the result 1114. The output of the summation and subtraction block 1112 can be the input into the eight-bit right shifter 1010 and/or the eight bit rightshifter 1012. The result of the bitshifting, adding, and subtracting is multiplication by 181. In FIG. 11, a left bitshift may represent multiplication by two while a right bitshift may represent division by two. However, the direction of bitshifting and its association with either multiplication or division may depend on endianness of a system. For various systems, the bitshifting can be applied according to the endianness of the system, i.e., using left shifting to implement multiplication in some systems or using left shifting to implement division in other systems.

Referring now to FIG. 12, a graph 1200 illustrating a regular single-path delay feedback (SDF) FFT and a SDF FFT with an integrated half-bin offset, according to an exemplary embodiment. The regular SDF FFT is indicated by the marker 1202 while the SDF FFT with the integrated half-bin offset is indicated by the marker 1204. Spectral leakage of the half-bin offset FFT and the regular FFT for a given input signal is illustrated in the graph 1200 as the input signal is walked across frequency. The data illustrated in the graph 1200 is the data results from the simulations of Simulink HDL coder blocks implementing an SDF FFT. The expected 0.9 dB loss is shown, verifying the performance of the SDF FFT with the integrated half-bin offset.

Figure 13:
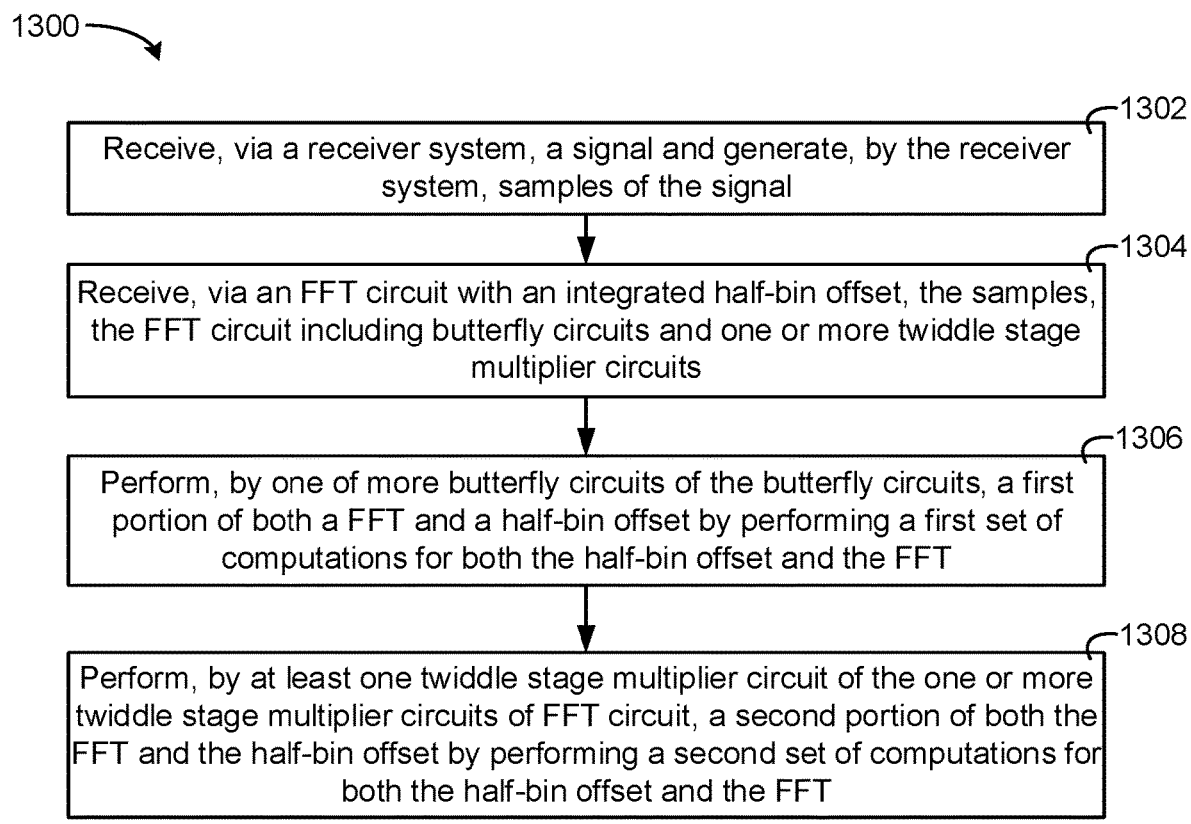
FIG. 13 is a flow diagram of a process for performing both a FFT and a half-bin offset with a FFT circuit with an integrated half-bin offset according to exemplary aspects of the inventive concepts disclosed herein.

Referring now to FIG. 13, a process 1300 is shown for performing both an FFT and a half-bin offset with a FFT circuit with an integrated half-bin offset, according to an exemplary embodiment. In some embodiments, the FFT circuit 600, the FFT circuit 500, and/or the FFT circuit 400 are configured to perform the process 1300.

In step 1302, a receiver system receives a signal and generates samples for the signal. In some embodiments, the receiver system includes one or more antennas, receivers, analog inputs, circuits, processing and/or any other component necessary to receive a transmitted signal and generate digital samples for the signal. In some embodiments, the receiver is part of a GPS system.

In step 1304, an FFT circuit with an integrated half-bin offset receives the samples of the signal from the receiver system. In some embodiments, the FFT circuit includes one or multiple different butterfly circuits and one or more twiddle stage multiplier circuits which are the same as and/or similar to the butterfly circuits and the twiddle stage multiplier circuits described with reference to FIGS. 4-11. In some cases, one or more of the butterfly circuits are modified or are operated in a modified manner to perform both an FFT and an integrated half-bin offset without requiring a separate FFT circuit and a separate half-bin offset circuit, i.e., circuit computations for the FFT and the half-bin offset are integrated together within the butterfly circuits. Similarly, at least one of the one or more twiddle stage multiplier circuits can perform both multiplication for the FFT and the half-bin offset.

In step 1306, one or more of the butterfly circuits perform a first portion of both the FFT and the half-bin offset by performing a first set of computations for both the half-bin offset and the FFT. In some embodiments, the butterfly circuits that perform the computations for both the half-bin offset and the FFT are before and/or after the twiddle stage multiplier with respect to signal flow through the FFT circuit. In some embodiments, the integration of both other butterfly circuits of the FFT circuit perform only computations for the FFT or only computations for the half-bin offset.

In step 1308, the at least one twiddle stage multiplier circuit of the one or more twiddle stage multiplier circuits performs a second portion of both the FFT and the half-bin offset by performing a second set of computations for both the half-bin offset and the FFT. In some embodiments, the twiddle stage multiplier receives and/or retrieves multiplication coefficients for the FFT and/or the half-bin offset from a memory device. In response to receiving the coefficients, the twiddle stage multiplier circuit can multiply various signals received from one of the butterfly circuits by the FFT and/or half-bin offset coefficients to implement both the second portion of the calculations of the FFT and/or the half-bin offset.

Referring generally to FIGS. 1-12, a system and method for calculating an FFT of a data sequence with a half-bin offset that is optimized for ASIC and/or FPGA implementations. This system and method utilize symmetries of the half-bin offset exponential, in order to bring half-bin offset coefficients into the twiddle stage of the FFT. The system and method described can be generalizable to any length of SDF FFT, since the first twiddle factor is after the second butterfly on longer SDF FFTs.

Via the integration of the half-bin offset into the FFT, the need for four fully configurable Booth multipliers on the input stage of the FFT is removed. These Booth multipliers are replaced with 2 CSD constant integer multipliers, 2 bit shifters, 2 adders, and/or a unary minus. This is a considerable reduction in area and power for hardware implementation. Additionally, pipelining stages around the configurable multipliers are no longer needed.

Figure 14:
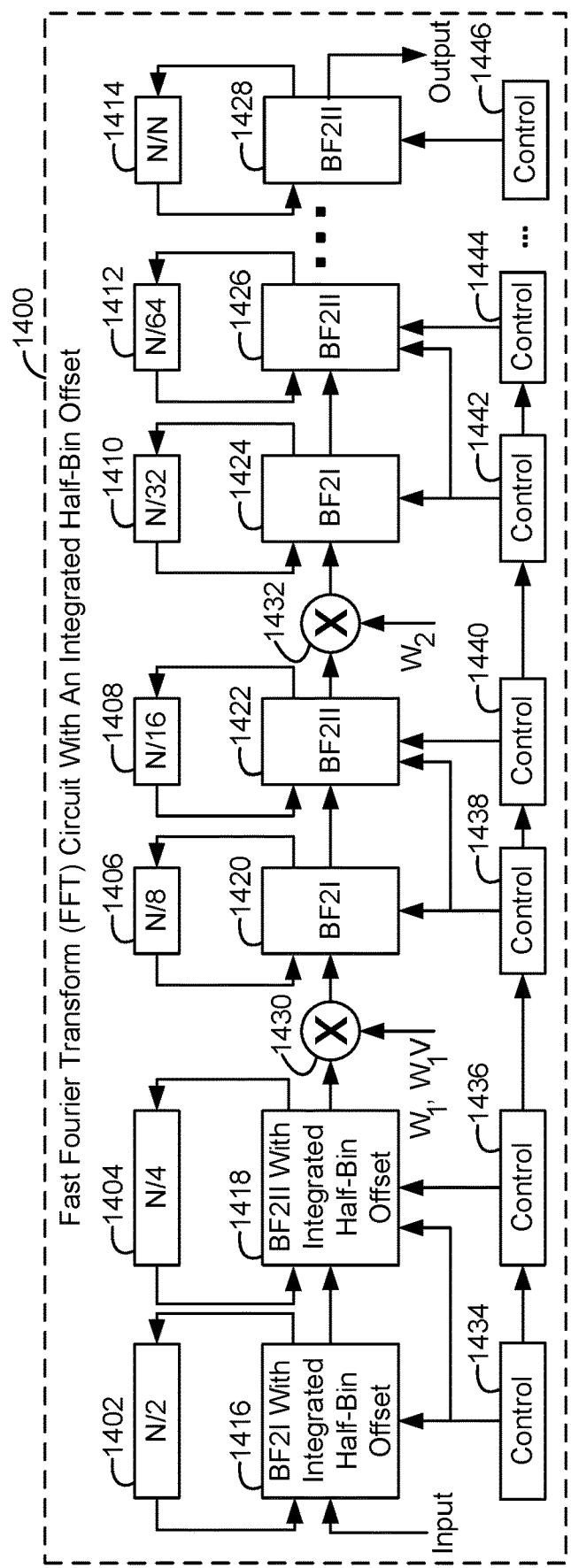
FIG. 14 is a block diagram of a FFT circuit with an integrated half-bin offset that can be implemented as any length FFT where the half-bin offset can be implemented at any stage of the FFT according to exemplary aspects of the inventive concepts disclosed herein.

Referring now to FIG. 14, a generalized FFT with an integrated half-bin offset circuit is shown, according to an exemplary embodiment. In some embodiments, FFT 1400 can be any length and include an integrated half-bin offset. Furthermore, the FFT circuit 1400 can be a radix $2^2$ FFT although in various embodiments, the integration of the half-bin offset with the FFT can be applied to any kind of radix 2, radix 4, parallelized FFT, feedback (single path) FFTs, and/or any other type of FFT circuit.

In FIG. 14, butterfly circuits 1416-1428 (BF2I and BF2II type butterfly circuits) are included by the FFT circuit 1400. Control signals 1434-1446 (which can be a clock signal) generated by the FFT 1400 and/or an external system and can be configured to control the butterfly circuits 1416-1428 (e.g., set to specific values to control the butterfly circuits 1416-1428). The butterfly circuits 1416 and 1418 can be configured to perform calculations for both the FFT and the half-bin offset and may be the same as, and/or similar to, the circuits 610 and/or 612 as described with reference to FIG. 6, FIG. 8, and FIG. 9. Furthermore, the coefficients used by twiddle stage multiplier 1430 can be coefficients for the FFT and the half-bin offset.

Butterfly circuits 1420-1428 may only perform calculations for the FFT. In this regard, in some embodiments, only the first two butterfly circuits of the FFT circuit 1400 need to be modified to incorporate calculations for the half-bin offset, any number of butterflies (e.g., the butterfly circuits 1420-1428) and/or twiddle multipliers (e.g., the twiddle multiplier 1431) can follow the modified butterfly circuits and/or the twiddle multiplier 1430 and thus, the FFT circuit 1400 can be extendable to any length FFT while only modifying the first stage of the FFT circuit 1400 to incorporate the half-bin offset, i.e., once the signal passes out of the twiddle stage multiplier 1430, the half-bin offset is fully applied. This makes the FFT circuit 1400 easily reusable and extendible since the implementation of the half-bin offset would be the same for a 32 element FFT or a 4096 element FFT.

In some embodiments, there are $\log_4 N-1$ twiddle multipliers in the FFT. However, only one of the twiddle multipliers, e.g., the twiddle multiplier 1430 can apply coefficient multiplication for the half-bin offset. However, in some embodiments, the coefficient multiplication for the half-bin offset is spread across one or multiple of the twiddle multipliers of the FFT circuit 1400 at any position within the FFT 1400. The modifications of the butterfly circuit 1416, the butterfly circuit 1418, and the twiddle stage multiplier 1430 do not need to be implemented into the first butterflies and twiddle stage multiplier of the FFT 1400 as shown in FIG. 14. In some embodiments, the integration of the half-bin offset can be in later twiddle multipliers and/or butterflies of the FFT 1400. For example, in some cases, one or more multiplicative factors of the half-bin offset can be prorogated into back end of the FFT into the last twiddle multiplier of the FFT 1400.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A fast Fourier transform (FFT) circuit with an integrated half-bin offset for performing both an FFT and a half-bin offset on an input signal,
wherein the FFT circuit is configured to receive a plurality of input samples of the input signal and generate a plurality of output signals via a plurality of butterfly circuits and one or more twiddle stage multiplier circuits of the FFT circuit, wherein the plurality of output signals are signals representing a frequency spectrum of the input signal;
wherein one or more butterfly circuits of the plurality of butterfly circuits are configured to implement a first portion of both the half-bin offset and the FFT by integrating a first set of computations for both the half-bin offset and the FFT within the one or more of the plurality of butterfly circuits;
wherein at least one of the one or more twiddle stage multiplier circuits is configured to implement a second portion of both the half-bin offset and the FFT by integrating a second set of computations of both the half-bin offset and the FFT within the twiddle stage multiplier circuit.

2. The FFT circuit of claim 1, wherein the FFT circuit further comprises a look-up memory configured to store a plurality of twiddle-stage coefficients, wherein the plurality of twiddle-stage coefficients comprise one or more FFT coefficients associated with the FFT and one or more half-bin offset coefficients associated with the half-bin offset.

3. The FFT circuit of claim 2, wherein the at least one twiddle stage multiplier circuit is configured to implement the second portion of both the half-bin offset and the FFT by:
receiving the one or more FFT coefficients and the one or more half-bin offset coefficients from the look-up memory; and
multiplying at least one of the one or more FFT coefficients and at least one of the one or more half-bin offset coefficients with one or more input signals of the twiddle stage multiplier circuit.

4. The FFT circuit of claim 2, wherein a second butterfly circuit of the one or more butterfly circuits is configured to multiply one or more inputs of the second butterfly circuit by a second half-bin offset coefficient.

5. The FFT circuit of claim 4, wherein the second half-bin offset coefficient is a complex number, $(1-j)/\sqrt{2}$.

6. The FFT circuit of claim 4, wherein the second butterfly circuit comprises a signal rotator circuit configured to multiply the one or more inputs of the second butterfly circuit by the second half-bin offset coefficient.

7. The FFT circuit of claim 6, wherein the signal rotator circuit comprises one or more addition or subtraction circuits, one or more canonical signed digit (CSD) multiplier circuits, and one or more bit-shifter circuits.

8. The FFT circuit of claim 7, wherein the one or more addition or subtraction circuits are configured to perform addition or subtraction to perform multiplication by $(1-j)$.

9. The FFT circuit of claim 7, wherein the one or more CSD multiplier circuits and the one or more bit-shifter circuits are configured to perform multiplication and bit-shifting to perform multiplication by $1/\sqrt{2}$.

10. The FFT circuit of claim 1, wherein a first butterfly circuit of the one or more butterfly circuits is configured to multiply one or more inputs of the first butterfly circuit by a first half-bin offset coefficient.

11. The FFT circuit of claim 10, wherein the first half-bin offset coefficient is a complex number, $-j$.

12. A signal processing system, the signal processing system comprising:
a receiver system configured to receive a signal and generate a plurality of samples of the signal;
a fast Fourier transform (FFT) circuit, the FFT circuit configured to receive the plurality of samples of the signal and generate a plurality of output signals via a plurality of butterfly circuits and one or more twiddle stage multiplier circuits, wherein the plurality of output signals are signals representing a frequency spectrum of the signal;
wherein one or more butterfly circuits of the plurality of butterfly circuits are configured to implement a first portion of both a half-bin offset and a FFT by integrating a first set of computations for both the half-bin offset and the FFT within the one or more of the plurality of butterfly circuits;
wherein at least one of the one or more twiddle stage multiplier circuits is configured to implement a second portion of both the half-bin offset and the FFT by integrating a second set of computations of both the half-bin offset and the FFT within the twiddle stage multiplier circuit.

13. The signal processing system of claim 12, wherein the FFT circuit further comprises a look-up memory configured to store a plurality of twiddle-stage coefficients, wherein the plurality of twiddle-stage coefficients comprises one or more FFT coefficients associated with the FFT and one or more half-bin offset coefficients associated with the half-bin offset.

14. The signal processing system of claim 13, wherein the at least one twiddle stage multiplier circuit is configured to implement the second portion of both the half-bin offset and the FFT by:
receiving the one or more FFT coefficients and the one or more half-bin offset coefficients associated with the half-bin offset from the look-up memory; and
multiplying at least one of the one or more FFT coefficients and at least one of the one or more half-bin offset coefficients with one or more input signals of the twiddle stage multiplier circuit.

15. The signal processing system of claim 12, wherein a first butterfly circuit of the one or more butterfly circuits is configured to multiply one or more inputs of the first butterfly circuit by a first half-bin offset coefficient, wherein the first half-bin offset coefficient is a complex number, $-j$.

16. The signal processing system of claim 12, wherein a second butterfly circuit of the one or more butterfly circuits is configured to multiply one or more inputs of the second butterfly circuit by a second half-bin offset coefficient, wherein the second half-bin offset coefficient is a complex number, $(1-j)/\sqrt{2}$.

17. The signal processing system of claim 16, wherein the second butterfly circuit comprises a signal rotator circuit configured to implement multiplication of the one or more inputs of the second butterfly circuit by the second half-bin offset coefficient.

18. The signal processing system of claim 17, wherein the signal rotator circuit comprises one or more addition or subtraction circuits, one or more canonical signed digit (CSD) multiplier circuits, and one or more bit-shifter circuits.

19. A method of processing an input signal to perform both an FFT and a half-bin offset, the method comprising:
  receiving, via a fast Fourier transform (FFT) circuit, a plurality of input samples of the input signal; and
  generating, via the FFT circuit, a plurality of output signals based on the plurality of input samples via a plurality of butterfly circuits and one or more twiddle stage multiplier circuits of the FFT circuit, wherein the plurality of output signals are signals representing a frequency spectrum of the input signal, by:
    implementing, by one or more butterfly circuits of the plurality of butterfly circuits, a first portion of both the half-bin offset and the FFT by performing a first set of computations for both the half-bin offset and the FFT; and
    implementing a second portion of both the half-bin offset and the FFT by performing a second set of computations of both the half-bin offset and the FFT within at least one of the one or more twiddle stage multiplier circuits.

20. The method of claim 19, wherein the FFT circuit further comprises a look-up memory configured to store a plurality of twiddle-stage coefficients, wherein the plurality of twiddle-stage coefficients comprises one or more FFT coefficients associated with the FFT and one or more half-bin offset coefficients associated with the half-bin offset;
  wherein the method further comprises:
    receiving, via the at least one twiddle stage multiplier circuit, the one or more FFT coefficients and the one or more half-bin offset coefficients associated with the half-bin offset from the look-up memory; and
    multiplying, via the at least one twiddle stage multiplier circuit, at least one of the one or more FFT coefficients and at least one of the one or more half-bin offset coefficients with one or more input signals of the twiddle stage multiplier circuit.

* * * * *